Aug. 11, 1953
W. W. PAGET
2,648,488
APPARATUS FOR PROVIDING VARIABLE
QUANTITIES OF COMPRESSED FLUIDS
Filed Sept. 4, 1946
2 Sheets-Sheet 2
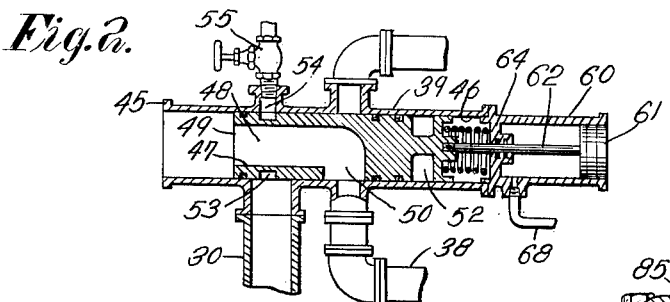
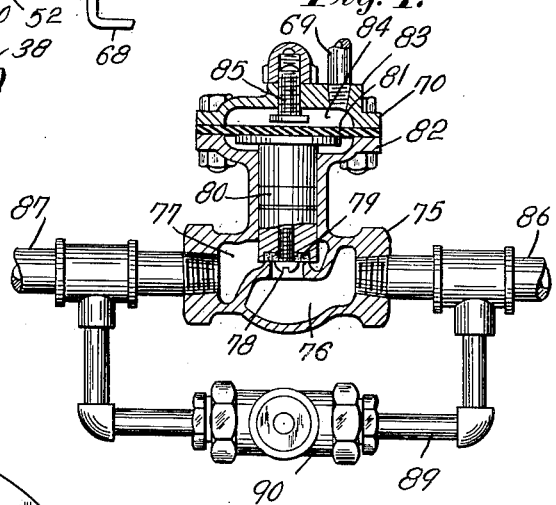
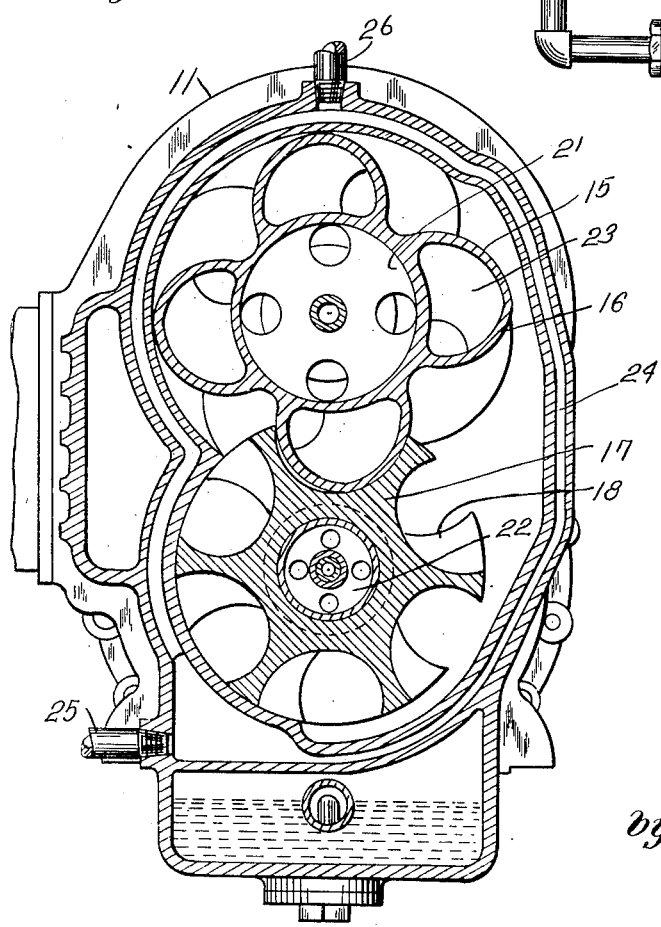
Inventor:
Wm. W. Paget.
by
Lewis A. Maxson.
Atty.

Patented Aug. 11, 1953

2,648,488

UNITED STATES PATENT OFFICE 2,648,488

APPARATUS FOR PROVIDING VARIABLE QUANTITIES OF COMPRESSED FLUIDS

Win W. Paget, Michigan City, Ind., assignor to Joy Manufacturing Company, a corporation of Pennsylvania Application September 4, 1946, Serial No. 694,766

15 Claims. (Cl. 230—26)

My invention relates to air or other gas compressing devices, and more particularly, though not exclusively, to unloading and cooling systems for such compressors of the space packing type.

Certain compressors of the high speed, lobed rotor type are operated at such high speeds and with such small clearances that it is possible to use space packings, so called, and still maintain relatively high efficiencies. By the term "space packing" is meant simply that the clearances between the outermost portions of the rotors and the housings in which they are received and rotated, and between the rotor elements themselves, are made very small while yet actual contact is prevented. In other words, sealing is not accomplished by having the rotors contact with each other and with the internal walls of the chambers in which they rotate, but simply by maintaining, through small clearances and through appropriate geared connections between the rotors, such very close running clearances that at the speeds of operation which are employed leakage is kept at so low an amount that it may be disregarded. In the operation of compressors of this character at the high speeds at which they are driven, it would be fatal to have physical engagement of the rotors with each other or of the rotors with the housing, and accordingly where such devices are to be used to provide air intermittently instead of continuously, serious problems are encountered, for anything which would result in a marked change of temperature of any of the cooperating parts might, through contraction of a relatively outer part or expansion of a relatively inner part, referring here either to parts as a whole, or to cooperating portions of larger parts, result in contact, and so in the ruination of the compressor. However, if, both during loaded operation and unloaded operation, substantially constant temperatures of the parts be maintained, the danger mentioned may be very largely eliminated. Such a maintenance of constant temperatures is possible, according to my invention, by maintaining, though the discharge of the compressor be connected back to atmosphere or to whatever other intake source is being employed, substantially the same number of compressions in the compressor when it is unloaded as during loaded operation, and desirably by suitably reducing the cooling of the compressor so that only the lesser amount of heat of compression is removed that is produced by the compression of the much diminished quantity of air or other gas.

It will be evident that my invention may, in its different aspects and in different embodiments, be applied to single or multiple stage compressors, to compressors with jacketed casings or with air-cooled casings, to compressors having rotors with or without internal cooling, and that still other adaptations and modifications of my invention may be employed within the scope of the appended claims.

It is an object of my invention to provide an improved unloading mechanism. It is another object of my invention to provide an improved unloading mechanism for lobed rotor type compressors employing space packing. It is a further object of my invention to provide an improved load regulating system in which the discharge is bypassed to atmosphere at the same time that a restriction is imposed upon the intake, causing the compressor to continue to operate with the same ratio between absolute intake and absolute discharge pressures. It is a further object of my invention to provide an improved compressor employing an improved load regulating system as just described and having in conjunction with it improved means for limiting and controlling the amount of cooling water; the whole structure and method of operation being aimed at maintaining constant temperatures of the housing and rotors, whether working at full load or at minimum load. It is a still further object of my invention to provide an improved air or gas compressor provided with improved unloading means for causing the compressor to continue to operate during unloading through the same number of compressions but with greatly reduced quantity of fluid compressed and having improved means for limiting and controlling the amount of cooling water so that the temperatures of the housing and rotors, whether working at full load or at minimum load, are maintained substantially constant. Other objects and advantages of my invention will hereinafter more fully appear.

In the accompanying drawings, in which one illustrative embodiment which my invention may assume in practice, is shown:

Fig. 2 is a detail sectional view of the unloading devices proper of Fig. 1, showing these in a different position.

Fig. 3 is a vertical, transverse section through the rotors of the low pressure stage of the two-stage compressor shown in Fig. 1, and showing some details of the cooling system.

Fig. 4 is a detail view of a portion of the automatic cooling water control system.

Figure 1:
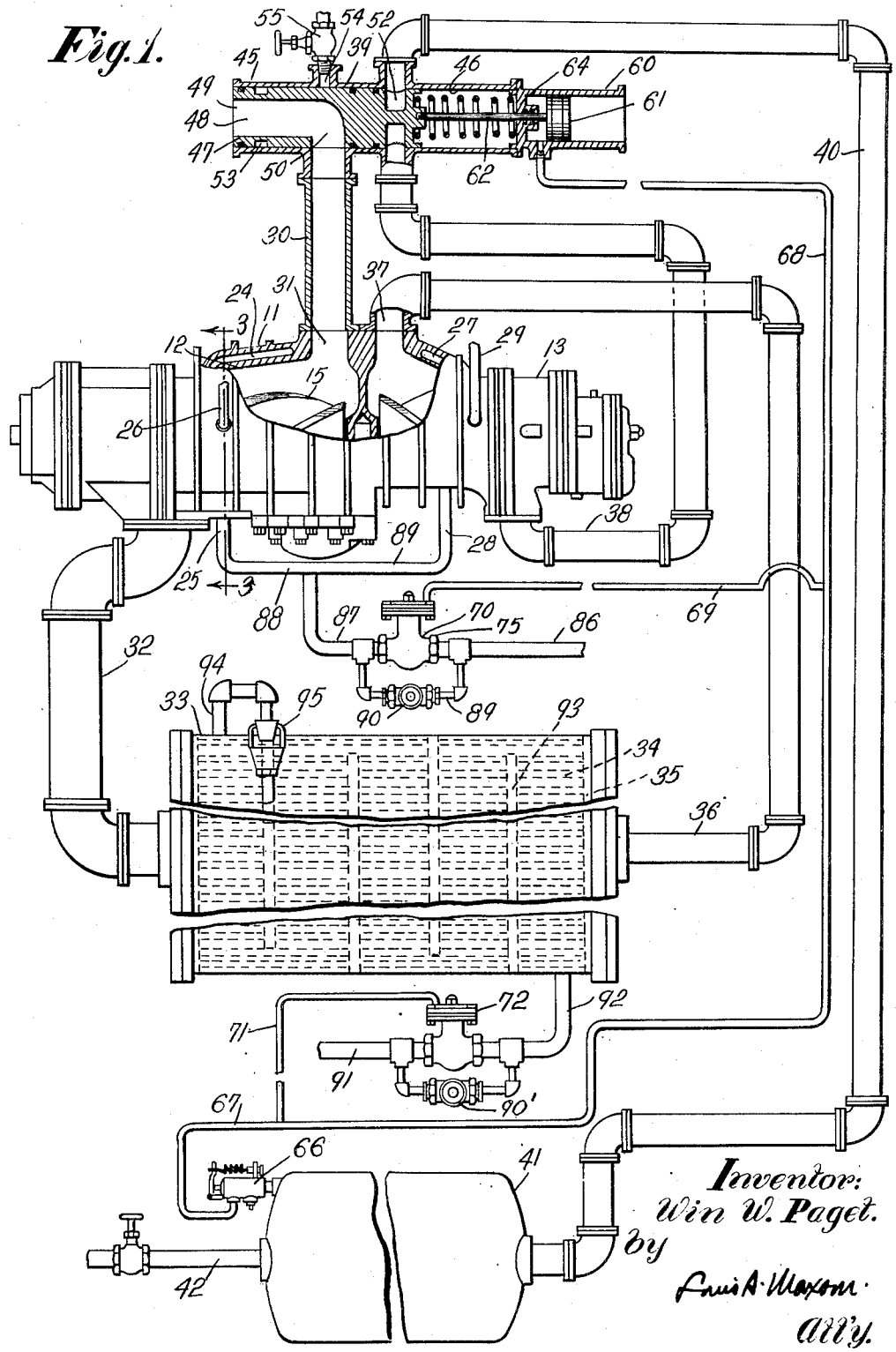
Fig. 1 is a generally diagrammatic view, with parts in section, showing the illustrative embodiment of my invention incorporated in conjunction with a two-stage, lobed rotor type compressor.

Referring to the drawings, and bearing in mind that my invention is also applicable, with suitable detail modifications, to single stage compressors or to compressors with more than two stages, and that it is not limited in many of its aspects to space packed compressors at all, it will be observed that Figure 1 shows a two-stage lobed rotor compressor at 11, the low pressure stage of this compressor being shown at 12 and the high pressure stage at 13. Each stage includes a pair of lobed rotors, and Fig. 3 shows a transverse section through the rotors of the low pressure stage. Herein the rotor 15 is shown with helically disposed lobes 16, while the rotor 17 is shown with helically disposed pockets or grooves 18. Each of these rotors may be cooled, if desired, by conducting fluid through the hollow central portion 21 or 22 respectively of the rotors 15 and 17; and it is also possible to conduct fluid through the hollow interior 23 of the rotor lobes 16. As the means whereby a circulation of fluid through the rotors can be effected will be readily understood by those skilled in the art, they will not be illustrated in detail, and I will confine my detail description of the control of cooling liquid to an arrangement by which circulation of liquid through jackets formed in the rotor casings is effected. It will be noted that the low pressure stage has a water jacket indicated at 24, to which liquid is supplied through a conduit 25 at its bottom and from which liquid is discharged through a top connection 26. The high pressure stage has another water jacket 27 to whose bottom cooling liquid is adapted to be supplied through a conduit 28, and from which the water is adapted to be discharged through another conduit 29; the conduits 28 and 29 also being arranged respectively at the bottom and top of the cooling jacket 27.

Fuid to be compressed may be supplied through a connection 30 to the intake 31 of the low pressure stage, and following compression through the desired ratio in that stage, is discharged by conduit 32 to one end of a heat exchanger (intercooler) 33, which is herein shown as of the water cooled type. The fluid compressed in the low pressure stage passes through the numerous tubes 34 in the intercooler 33 and to a header or discharge space 35 which is connected by a conduit 36 to the intake 37 of the high pressure stage 13. After compression through the further desired ratio of compression in this stage (it is to be noted that in each stage there is a built-in ratio of compression, the volume of fluid entrapped between the rotors and the casing being reduced in a predetermined manner between the instant when communication with the intake is cut off and the moment when communication with the discharge is effected), the fluid passes through a conduit 38 and after passing through the device 39, which I shall shortly describe, it is conducted by a conduit 40 to a receiver 41, from which it may be drawn off for use through a valve controlled connection 42. Each section of the compressor 11 may for example be made on design principles similar to those of the device shown in the Lysholm Patent No. 2,111,568, and the entire compressor, including both stages as illustrated, is closely similar to that shown in my copending application Serial No. 482,422, now Patent No. 2,444,951, though in a two-stage compressor much higher ratios of compression may be used than were there called for by its special use.

The mechanism 39 incorporates in it means for discontinuing the normal communication of the compressor intake with the space from which fluid is taken for compression during normal loaded operation, and means for establishing a much restricted communication between the compressor intake and that space, means for interrupting communication between the compressor's terminal discharge line and the receiver or other point of use, and means for establishing a connection between the compressor discharge connection and the space from which the compressor takes the fluid which is compressed in it, and means for effecting the changes of connections mentioned. Desirably, means for regulating the restricted communication between the compressor intake and its source of supply is also provided; and desirably the means for altering the connections as described and for effecting return to such connections when a renewed pumping of air is desired is provided with automatic control means.

The mechanism 39, as illustrated, includes a cylindrical casing 45 having a bore 46 in which there is reciprocably mounted a valve member 47 which has, as illustrated, a right-angled passage 48 opening through one end and one side thereof and comprising what may be called an axial portion 49 and a lateral portion 50. The portion 50, in the position of the member 47 shown in Fig. 1, communicates with the intake conduit 30 for the compressor, but is positionable as shown in Fig. 2 to connect the discharge conduit 38 through the side opening 50 and the axial opening 49 back with the source from which the compressor draws in the fluid to be compressed. The valve member 47 also has, as illustrated, an annular groove 52 which in the position of the parts of Fig. 1 connects the discharge conduit 38 with the discharge line 40, and this annular groove is positionable, when the parts are as shown in Fig. 2, so that it is completely cut off from communication with all points outside itself by the cylindrical wall of the bore 46. The member 47 also has a peripheral groove 53 which is adapted to connect an auxiliary intake connection 54 with the intake conduit 30 when the parts are in the position shown in Fig. 2, and which, in the position of the parts shown in Fig. 1, is out of communication with any exterior connection. An adjustable valve mechanism 55 is desirably provided to control the quantity of fluid which may be taken in by way of the groove 53 into the intake conduit 30. The member 39 supports, a coaxial with it and at its right hand end in Fig. 1, a cylinder 60 in which a piston 61 is reciprocable. The piston 61 is connected by a piston rod 62 to the member 47 and normally maintains the latter in the position shown in Fig. 1 except when fluid of adequate pressure and in adequate quantity is admitted to the side of the piston 61 next to the head 64 and moves the valve device 47 to the position shown in Fig. 2. Any suitable means may be provided for limiting the movement of the piston so that the parts may occupy positions corresponding to those of Figs. 1 and 2 at their opposite extremes of motion. If desired, a stop ring can be placed at the right hand end of the cylinder 60 and at the left hand end of the cylindrical casing 45; or other suitable means may be provided.

A pilot valve 66, which is adapted upon the attainment of a predetermined desired maximum receiver pressure automatically to admit receiver pressure to a line 67, and which is adapted automatically upon a predetermined desired drop in the receiver pressure from such maximum to cut off the receiver pressure supply to the line 67 and to vent the fluid previously supplied to that line, is mounted on the receiver 41 and in communication therewith. This pilot valve mechanism obviously may assume any desired form, but as illustrated is of the well known R. C. type. The conduit 67 is adapted to supply fluid to the cylinder 60 through the terminal portion 68 thereof, in the illustrated arrangement of the parts. It is also adapted, through a branch 69, to supply fluid to a cooling water control valve mechanism 70, and through a connection 71 to another cooling water supply controlling valve mechanism 72. The mechanisms 70 and 72 are substantially alike and may be understood by reference to Fig. 4, which shows the mechanism 70 in section. A valve casing 75 has a supply chamber 76 and a discharge chamber 77 arranged in it and connected by a port 78 which may be opened or closed according to the position of a washer 79 on the bottom of a plunger 80. The plunger 80 is normally held engaged, by fluid under pressure in the supply chamber 76, with a flexible diaphragm 81 clamped between the head 82 of the casing 75 and a head member 83 which is formed with a pressure fluid receiving pocket 84 to which the connection 69 leads and which is provided with a stop 85 for limiting the opening movement of the plunger 80 and the washer which it carries. A line 86 leading from any suitable source of supply leads to the space 76, and the chamber 77 is connected by a line 87 to the branch conduits 88 and 89 which lead respectively to the jacket 24 of the low pressure stage of the compressor and to the jacket 27 of the high pressure stage. A valve controlled bypass 89 with an adjustable control valve 90 therein serves to regulate the amount of liquid which can pass between the conduits 86 and 87 when the chambers 76 and 77 are cut off from communication with each other, as occurs upon the supply of pressure fluid through the connection 69 into the chamber 84, with resultant depression of the diaphragm 81 and plunger 80 and seating of the washer 79 over the passage 78. The valve mechanism 72 is of the same type as the valve mechanism 70 and controls the communication of a conduit 91 leading from a suitable source of cooling liquid with a conduit 92 leading to the bottom, near one end of the water space thereof, of the intercooler or heat exchanger 33. The water is caused to pass repeatedly over the air tubes 34 by suitable baffles 93, and finally discharges at 94 through a suitable sight device 95 to any point of waste or return to a cooling system. It will be evident that the valve 90 and the corresponding valve 90' of the mechanism 72 will be adjusted to provide just that amount of cooling which will be desired, with a much reduced quantity of fluid being compressed in the compressor, when the valve member 47 is in the position shown in Fig. 2.

The mode of operation of the illustrative embodiment of my invention will be readily understood from what has been said. Starting with the position of the parts as shown in Fig. 1, it will be observed that air enters through the axial passage portion 49 and passes through the lateral portion 50 in the valve member 47, and then passes through the conduit 30 into the intake 31 of the low pressure stage 12 of the compressor 11, and, having been compressed therein, passes through the conduit 32 and the intercooler 33 to the conduit 36 which leads back to the intake connection 37 of the high pressure stage 13 of the multi-stage compressor 11. The further compressed fluid is then discharged through the conduit 38 and through the groove 52 to the conduit 40 and into the receiver. While this is going on, receiver pressure is below the value sufficient to open the pilot valve 66 and effect supply of fluid to the space between the piston 61 and the cylinder head 64, and of course, since the pilot valve 66, when it is not supplying fluid, operates to vent fluid from the devices to which it is designed to supply fluid when the receiver pressure gets high enough, it will be understood that the water from the conduit 86 to the jacket 24 of the low pressure stage and to the jacket 27 of the high pressure stage of the compressor, is being supplied in desired quantity, as also is water or other cooling liquid being supplied from the connection 91 to the water space in the intercooler 33.

When air or other fluid is being compressed through the number of compressions for which the compressor is designed, there is a predetermined temperature rise of the air passing through the compressor, and the cooling water is supplied in such volume as to maintain the compressor rotor casing (and any other water cooled parts thereof) at a certain desired temperature. When the compressor discharge pressure reaches the desired maximum, the pilot valve 66 automatically opens and supplies fluid to the conduit 67; and through the line 68, 69 and 71 fluid is supplied to move the control valve device 47 to the position shown in Fig. 2, to move the valve of the device 70 to the position shown in Fig. 2 and to move the valve of the device 72 to a corresponding closed position.

Referring to Fig. 2, it will be evident that the compressor will now discharge freely through the conduit 38, the side opening 50 and the axial opening 49 in the valve member 47, back to atmosphere or other point from which fluid is taken for compression. It will be evident that the intake of the compressor communicates with the source from which fluid is drawn, but only through the groove 53 and the connection 54 controlled by the valve 55, and accordingly, by the appropriate restriction of fluid entering the intake of the compressor, it will be possible to maintain the same ratio between the absolute intake and discharge pressures of the compressor (though the quantity of air compressed will be greatly reduced) as exists during the normal running of the system with the parts arranged as shown in Fig. 1.

It will be appreciated that by the appropriate cutting down of the quantity of cooling fluid to the jackets and to the intercooler, the quantity of heat carried away by the cooling water may be reduced in such a manner as to maintain the temperature of the parts of the compressor substantially unchanged during unloaded operation as compared with loaded operation, when a much greater volume of air moves through the compressor, and much more cooling water is supplied to the jackets and intercooler.

Part of the advantages of my invention can be obtained without obtaining precise identity of ranges of compression during unloaded and loaded operations, provided the quantity of cooling liquid is modified, but it is considered definitely preferable to have the parts subjected to the same temperatures and to reduce the rate of heat exchange so as to carry off only the desired reduced quantity of heat during unloading, rather than to have the air in the compressor vary in temperature at corresponding points when a change is made from loaded to unloaded operation and vice versa.

From the description given, it will be evident that I have provided an arrangement whereby difficulty due to sudden changes in temperature which might cause distortions and possible contacts between the rotors or between the rotors and the casing, may be avoided, and in which, after a little time has been given to the adjustments of valve devices 55, 90 and 90', a substantially automatic operation may be expected for extended periods. Because the compressor is of the built-in compression ratio type, it is possible to obtain substantial uniformity between the number of compressions during loaded and unloaded operation.

While there is in this application specifically described one embodiment of the invention, it will be understood that this is disclosed for purposes of illustration, and that the invention may be modified and embodied in various other forms without departing from its spirit or the scope of the appended claims.

What I claim as new and desire to secure by Letters Patent is:

1. A rotary compressor of the lobed rotor type having cooling means associated therewith and having means controlling said cooling means to reduce the quantity of cooling fluid delivered to said compressor when the same is operating unloaded, and means for unloading said compressor operative at least largely to eliminate the back pressure thereon while maintaining the ratio of compression therein substantially unchanged upon unloading.

2. A lobed rotor type rotary compressor having an intake and alternative connections therefor, one relatively unrestricted and the other having means for imposing on said intake a restriction sufficient to require said compressor to operate through the same number of compressions when unloaded as during loaded operation, and means for automatically changing said connections when the pressure in the space to which said compressor delivers air reaches a predetermined value.

3. In an apparatus for controlling a compressor, a casing having connections: one communicable with the intake of a compressor, a second communicable with the discharge of a compressor, a third communicable with a point of delivery, a fourth communicable with a source from which a controlled compressor draws fluid to be compressed, and a fifth also communicable with such a source, said last mentioned connection having means for controlling the freedom of communication therethrough, and a valve device in one position thereof connecting said fourth connection and said first connection and in the same position thereof connecting said second and third connections and in another position thereof connecting said first and fifth connections while connecting said second connection with said fourth connection.

4. In an apparatus of the character described, a compressor having a plurality of stages each having fluid cooling means associated therewith and having an intercooler arranged between said stages, means for controlling cooling liquid supply to effect the cooling of said stages and the intercooler, valve mechanism movable by fluid pressure to interrupt communication of the low pressure intake with the source of supply and to connect the high pressure discharge with such source of supply and to establish a restricted communication between said source of supply and the compressor intake, and a compressor discharge pressure responsive pilot device for controlling the supply and venting of operating fluid relative to said valve mechanism and to the controlling means for cooling liquid supply.

5. A compressor having an intake and a discharge, relatively restricted and relatively unrestricted connections with a supply space from which fluid may be conducted via such connections to said intake, a discharge connection to a receiver, and valve means having a control responsive to compressor discharge pressure for selectively connecting said intake with said relatively unrestricted connection and said discharge with the discharge connection to a receiver, and connecting said intake to said relatively restricted connection and said discharge with said relatively unrestricted connection with a supply space.

6. A compressor having an intake and a discharge, relatively restricted and relatively unrestricted connections with a supply space from which fluid may be conducted via such connections to said intake, a discharge connection to a receiver, and valve means having a control responsive to compressor discharge pressure for selectively connecting said intake with said relatively unrestricted connection and said discharge with the discharge connection to a receiver, and connecting said intake to said relatively restricted connection and said discharge with said relatively unrestricted connection with a supply space, said relatively restricted connection having controlling means therefor limiting the rate of fluid admission therethrough to reduce the pressure in the compressor intake in such manner that the ratio of compression is substantially the same during the subsistence of each of the selective sets of connections.

7. A compressor having an intake and a discharge, relatively restricted and relatively unrestricted connections with a supply space from which fluid may be conducted via such connections to said intake, a discharge connection to a receiver, and valve means having a control responsive to compressor discharge pressure for selectively connecting said intake with said relatively unrestricted connection and said discharge with the discharge connection to a receiver, and connecting said intake to said relatively restricted connection and said discharge with said relatively unrestricted connection with a supply space, said relatively restricted connection constructed and arranged to limit the rate of fluid admission therethrough to reduce the pressure in the compressor intake in such manner that the ratio of compression is substantially the same during the subsistence of each of the selective sets of connections.

8. A compressor having an intake and a discharge, relatively restricted and relatively unrestricted connections with a supply space from which fluid may be conducted via such connections to said intake, a discharge connection to a receiver, valve means having a control responsive to compressor discharge pressure for selectively connecting said intake with said relatively unrestricted connection and said discharge with the discharge connection to a receiver, and connecting said intake to said relatively restricted connection and said discharge with said relatively unrestricted connection with a supply space, and cooling means for said compressor having also a control responsive to compressor discharge pressure for reducing the cooling effect when the second set of selective connections subsist and increasing it when said first mentioned set subsist.

9. A compressor having an intake and a discharge, relatively restricted and relatively unrestricted connections with a supply space from which fluid may be conducted via such connections to said intake, a discharge connection to a receiver, valve means having a control responsive to compressor discharge pressure for selectively connecting said intake with said relatively unrestricted connection and said discharge with the discharge connection to a receiver, and connecting said intake to said relatively restricted connection and said discharge with said relatively unrestricted connection with a supply space, said relatively restricted connection having controlling means therefor limiting the rate of fluid admission therethrough to reduce the pressure in the compressor intake in such manner that the ratio of compression is substantially the same during the subsistence of each of the selective sets of connections, and cooling means for said compressor having also a control responsive to compressor discharge pressure for reducing the cooling effect when the second set of selective connections subsist and increasing it when said first mentioned set subsist.

10. A compressor having an intake and a discharge, relatively restricted and relatively unrestricted connections with a supply space from which fluid may be conducted via such connections to said intake, a discharge connection to a receiver, valve means having a control responsive to compressor discharge pressure for selectively connecting said intake with said relatively unrestricted connection and said discharge with the discharge connection to a receiver, and connecting said intake to said relatively restricted connection and said discharge with said relatively unrestricted connection with a supply space, said relatively restricted connection constructed and arranged to limit the rate of fluid admission therethrough to reduce the pressure in the compressor intake in such manner that the ratio of compression is substantially the same during the subsistence of each of the selective sets of connections, and cooling means for said compressor having also a control responsive to compressor discharge pressure for reducing the cooling effect when the second set of selective connections subsist and increasing it when said first mentioned set subsist.

11. A lobed rotor compressor designed to operate with space packing and having an intake, a discharge, and fluid cooling means, means for selectively connecting said intake with a source of fluid to be compressed and said discharge to a delivery line, or connecting said discharge to said source of fluid to be compressed and said intake with such source through such a restriction as results in a like number of compressions between intake and discharge pressures as when said compressor is raising the pressure from that at said source to normal discharge pressure, and means for automatically shifting said connections from those first set forth to those second mentioned and concurrently reducing the volume of fluid cooling medium used, automatically upon attainment to a predetermined maximum discharge pressure.

12. In combination, a compressor having an intake and a terminal discharge, means for establishing during loaded operation a communication between said intake and a space from which fluid is taken for compression and movable to establish, to effect unloading, a communication between said terminal discharge and said space, means for establishing during loaded operation a communication between said discharge and a point to which compressed air is delivered for use, means for establishing a restricted communication between said intake and said space, during unloading, to require said compressor to compress through the same number of compressions during unloaded operation as during loaded operation, and means responsive to compressor discharge pressure for controlling said several means.

13. In combination, a compressor, cooling means means therefor, means for venting the discharge of said compressor to atmosphere, means for so restricting the intake of the compressor that the ratio of its compressive action is the same when the compressor has its discharge vented to atmosphere and its intake restricted, as when it is compressing normally from unrestricted intake to normal discharge pressure, means for actuating both of said venting and restricting means in response to the development of a predetermined compressor discharge pressure, and means also responsive to compressor discharge pressure and operable on development of such predetermined compressor discharge pressure for controlling said cooling means to restrict its cooling in proportion to the reduction in mass of fluid compressed.

14. In combination, a compressor, means for automatically shifting the discharge thereof to a point at a pressure less than its working discharge pressure, upon the attainment of working discharge pressure to a predetermined value, means for automatically restricting the compressor intake, upon such shifting, to provide the same ratio of compression for the compressor as during discharge against normal working discharge pressure, and cooling means for said compressor having controlling means for automatically varying its cooling effect substantially in proportion to the change in mass of the gaseous fluid pumped by said compressor in unit time under the different operating conditions set forth.

15. In combination, a compressor having an intake and a discharge and cooling means, means for reducing the back pressure at the discharge of the compressor, means for restricting the compressor intake, and means for varying the cooling effect of said cooling means to provide for maintenance of like compressor temperatures with the intake restricted and reduced discharge pressure and with the intake unrestricted and normal loaded discharge pressure, whereby, through the compression of a reduced mass of gas through an appropriate range and the subtraction from the compressed gas of a reduced quantity of heat, the temperature of the compressor can be maintained, when normal operation is discontinued, substantially uniform with the temperature during normal operation.

WIN W. PAGET.

References Cited in the file of this patent

UNITED STATES PATENTS

| Number | Name | Date |
|---|---|---|
| 581,418 | Green | Apr. 27, 1897 |
| 1,045,121 | Carroll | Nov. 26, 1912 |
| 1,136,957 | Hettinger | Apr. 27, 1915 |
| 1,419,097 | Andrews | June 6, 1922 |
| 1,568,103 | Tibbetts | Jan. 5, 1926 |
| 1,708,171 | Halvorsen | Apr. 9, 1929 |
| 1,754,218 | Aikman | Apr. 15, 1930 |
| 2,041,717 | Lamberton | May 26, 1936 |
| 2,137,752 | Ferguson | Nov. 22, 1938 |